(12) United States Patent
Antoniucci et al.

(10) Patent No.: US 11,780,407 B2
(45) Date of Patent: Oct. 10, 2023

(54) METHOD FOR CONTROLLING A VEHICLE WITH A PLURALITY OF OPERATING MODES

(71) Applicant: PSA AUTOMOBILES SA, Poissy (FR)

(72) Inventors: Lionel Antoniucci, Nanterre (FR); Stephane Lanoue, Coulommes (FR)

(73) Assignee: PSA AUTOMOBILES SA, Poissy (FR)

( * ) Notice: Subject to any disclaimer, the term of this patent is extended or adjusted under 35 U.S.C. 154(b) by 255 days.

(21) Appl. No.: 17/311,899

(22) PCT Filed: Dec. 2, 2019

(86) PCT No.: PCT/FR2019/052882
§ 371 (c)(1),
(2) Date: Jun. 8, 2021

(87) PCT Pub. No.: WO2020/120872
PCT Pub. Date: Jun. 18, 2020

(65) Prior Publication Data
US 2022/0024411 A1 Jan. 27, 2022

(30) Foreign Application Priority Data

Dec. 12, 2018 (FR) ...................... 1872733

(51) Int. Cl.
*B60R 25/24* (2013.01)
*B60R 25/04* (2013.01)
*G07C 9/00* (2020.01)

(52) U.S. Cl.
CPC ............ *B60R 25/241* (2013.01); *B60R 25/04* (2013.01); *G07C 9/00309* (2013.01); *B60R 2025/0415* (2013.01); *G07C 2009/00531* (2013.01)

(58) Field of Classification Search
None
See application file for complete search history.

(56) References Cited

U.S. PATENT DOCUMENTS 11,037,375 B2 * 6/2021 Jefferies ............. G06Q 30/0645
2010/0071427 A1 3/2010 Tsuruta
(Continued)

FOREIGN PATENT DOCUMENTS

DE 102006009899 A1 9/2007
DE 102008039156 A1 2/2010
(Continued)

*Primary Examiner* — Carlos Garcia
(74) *Attorney, Agent, or Firm* — Sandberg Phoenix & von Gontard PC

(57) ABSTRACT

The method for controlling a vehicle comprises a step (E100) of implementing a first operating mode of the vehicle, for which the vehicle operates at least partially, the first operating mode being associated with an operating state of the vehicle allowing said implementation of the first operating mode. This control method comprises: a step (E101) of periodically monitoring the completion of an event during the step (E100) of implementing the first operating mode for detecting the event; a step (E102) of modifying the operating state, triggered by the detection of the event, for authorizing the activation of a second operating mode of the vehicle associated with the modified operating state; a step (E103) of activating the second operating mode of the vehicle authorized by the modified operating state.

14 Claims, 6 Drawing Sheets

(56) References Cited

U.S. PATENT DOCUMENTS

2020/0134932 A1* 4/2020 Jefferies ............... G07C 5/0808
2021/0407217 A1* 12/2021 Jefferies ............. G06Q 30/0645

FOREIGN PATENT DOCUMENTS

DE   102013202958 A1   8/2013
EP        2264672 A2  12/2010
FR        2975561 A1  11/2012

* cited by examiner

METHOD FOR CONTROLLING A VEHICLE WITH A PLURALITY OF OPERATING MODES

CROSS-REFERENCE TO RELATED APPLICATIONS

This application is the US National Stage under 35 USC § 371 of International Application No. PCT/FR2019/052882, filed 2 Dec. 2019 which claims priority to French Application No. 1872733 filed 12 Dec. 2018, both of which are incorporated herein by reference.

BACKGROUND

This disclosure relates to a method of managing operating modes of a vehicle. In this sense, a method is disclosed for controlling a vehicle, in particular a motor vehicle.

Conventionally, an immobilizer device, also called an "immobilizer," for a motor vehicle comprises the means necessary to prevent the vehicle from starting when a hands-free vehicle identification device is not present in the passenger compartment of the vehicle. In the conventional operation of the immobilizer device, for example of the coded immobilizer type, a random number is generated by a computer such as a combustion engine control computer. This random number is sent by a serial system bus (for example of the CAN type) to an intelligent ancillary box. If the hands-free identification device is authenticated by the intelligent ancillary box having received the random number, the intelligent ancillary box responds to the combustion engine control computer by sending it an encrypted key allowing the immobilizer device to be unlocked to authorize the starting and operation of the vehicle without restrictions.

Vehicles are currently evolving to meet new needs, such as the provision of an additional service that may impact the operation of the vehicle.

For example, patent application DE102013202958 provides a solution for restricting the operation of a vehicle in order to switch this vehicle from a fully operational operating mode for a main driver to a restricted operating mode for a secondary driver. The change from this fully operational operating mode to the restricted operating mode can be done using a code. This solution is limited to one restricted operating mode. Furthermore, there is a problem of fluidity in the transition from one operating mode to another. Indeed, DE102013202958 proposes to use a timer to authorize the change from the restricted operating mode to the fully operational operating mode at the end of the timer; this therefore poses a problem of fluidity of the variation from the restricted operating mode to the fully operational operating mode. Moreover, DE102013202958 discloses that the change of operating mode may require that the vehicle be parked to allow the change of operating mode.

SUMMARY

Briefly stated, a method is disclosed which allows a smooth transition during the activation of an operating mode of a vehicle while this vehicle was initially in the process of executing another operating mode.

To this end, a method is disclosed for controlling a vehicle, said control method comprising a step of implementing a first operating mode of the vehicle, for which the vehicle operates at least partially, the first operating mode being associated with an operating state of the vehicle allowing said implementation of the first operating mode; this control method being characterized in that it comprises:
  a step of periodically monitoring the completion of an event during the step of implementing the first operating mode for detecting the event,
  a step of modifying the operating state, triggered by the detection of the event, for authorizing the activation of a second operating mode of the vehicle associated with the modified operating state, and
  a step of activating the second operating mode of the vehicle authorized by the modified operating state.

Such a control method has the advantage, due to the periodic monitoring that it implements, of allowing the activation of the second operating mode via the modification of the operating state caused by the detection of the completion of the event resulting from the monitoring step. In this sense, the activation of the second operating mode can be done in a fluid and transparent manner for the driver of the vehicle.

The control method may comprise one or more of the following features:
  the vehicle comprises a first computer providing at least one service during the step of implementing the first operating mode and a second computer ensuring the management of the vehicle, wherein the monitoring step comprises: periodically sending, preferably at regular intervals, a first message by the first computer to the second computer; upon each reception of the first message by the second computer, sending of a second message by the second computer to the first computer; upon each reception of a second message by the first computer, processing of said second message by the first computer triggering the implementation of the step of modifying the operating state when the second message indicates that the event has been completed;
  each second message sent by the second computer is produced by the second computer such that: prior to the completion of the event, the second message comprises first information representative of the operating state associated with the first operating mode; when the event has been completed, the second message comprises a second piece of information representative of the operating state authorizing the activation of the second operating mode;
  the control method is such that: the operating state associated with the first operating mode is a partial unlocking state such that the vehicle operates in a restricted manner during the implementation of the first operating mode; the control method comprises a step of authenticating a device for identifying the vehicle from which the completion of the event results; the step of modifying the operating state ensures the transition from the operating state to a total unlocking state of the vehicle allowing unrestricted operation of the vehicle;
  the first operating mode is a thermal preconditioning service of the vehicle, or the first operating mode is an autonomous parking service of the vehicle;
  the control method is such that: the operating state associated with the first operating mode is a total unlocking state allowing unrestricted operation of the vehicle; the control method comprises a step of requesting activation of the second operating mode; the event comprises the step of requesting activation of the second operating mode;
  a vehicle identification device being present in a vehicle passenger compartment during the step of implementing the first operating mode, the event comprises the removal of the identification device from the passenger compartment;

the second operating mode is an autonomous parking service for the vehicle or a thermal preconditioning service for the vehicle, and at the end of the implementation of this service, the control method comprises a step of stopping the second operating mode and a step of changing the operating state to a locked state of the vehicle ensuring the immobilization of the vehicle.

The invention also relates to an immobilizer device for a vehicle, this immobilizer device comprising means for carrying out the steps of the control method as described.

The invention also relates to a vehicle comprising the immobilizer device as described.

Other advantages and features will emerge clearly from the description which follows.

BRIEF DESCRIPTION OF THE FIGURES

The invention will be better understood upon reading the description which follows, given solely by way of non-limiting example and done in reference to the accompanying drawings listed below.

DETAILED DESCRIPTION OF THE INVENTION

Figure 1:
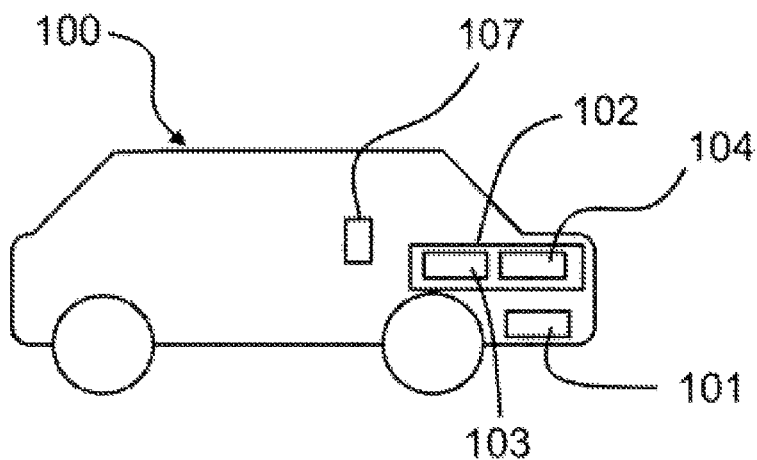
FIG. 1 shows a motor vehicle according to one embodiment.

In the present description, a vehicle 100 is preferably a motor vehicle as for example illustrated in FIG. 1.

In the present description, "ADC" is used to designate a coded immobilizer device, "IAB" is used to designate an intelligent ancillary box, "MEC" is used to designate a multifunction engine computer such as a control computer for a combustion engine of the vehicle 100 or an engine control computer, "CAN" is used to designate a serial system bus or controller area network, "MCUx" (machine control unit) is used to designate an engine control computer of the front electric motor of the vehicle 100 if x is 1 or rear of the vehicle 100 if x is 2, "TCU" is used to designate a vehicle gearbox control computer 100 or traction control unit, and "HFI" is used to designate a hands-free identification device of the vehicle 100.

Figure 2:
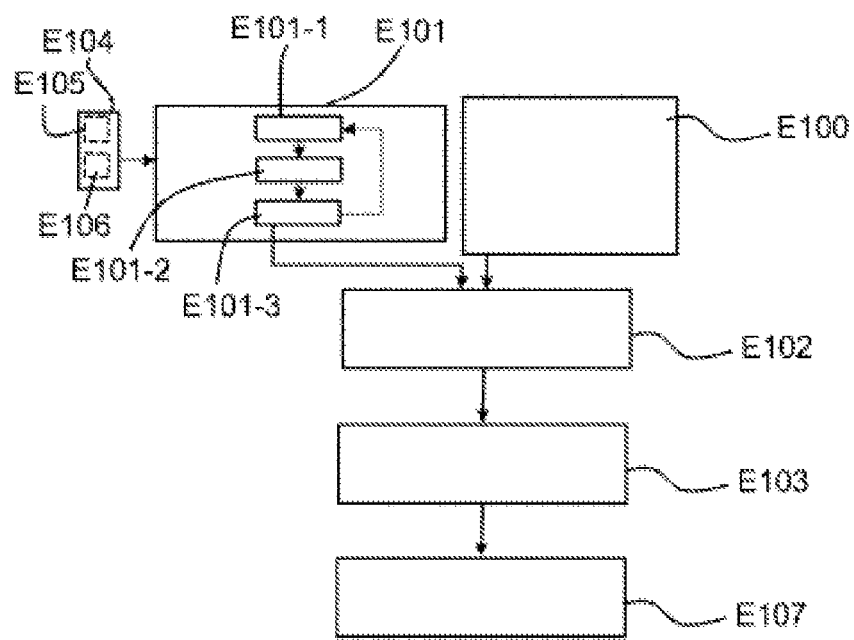
FIG. 2 illustrates steps of a control method according to one embodiment.
Figure 3:
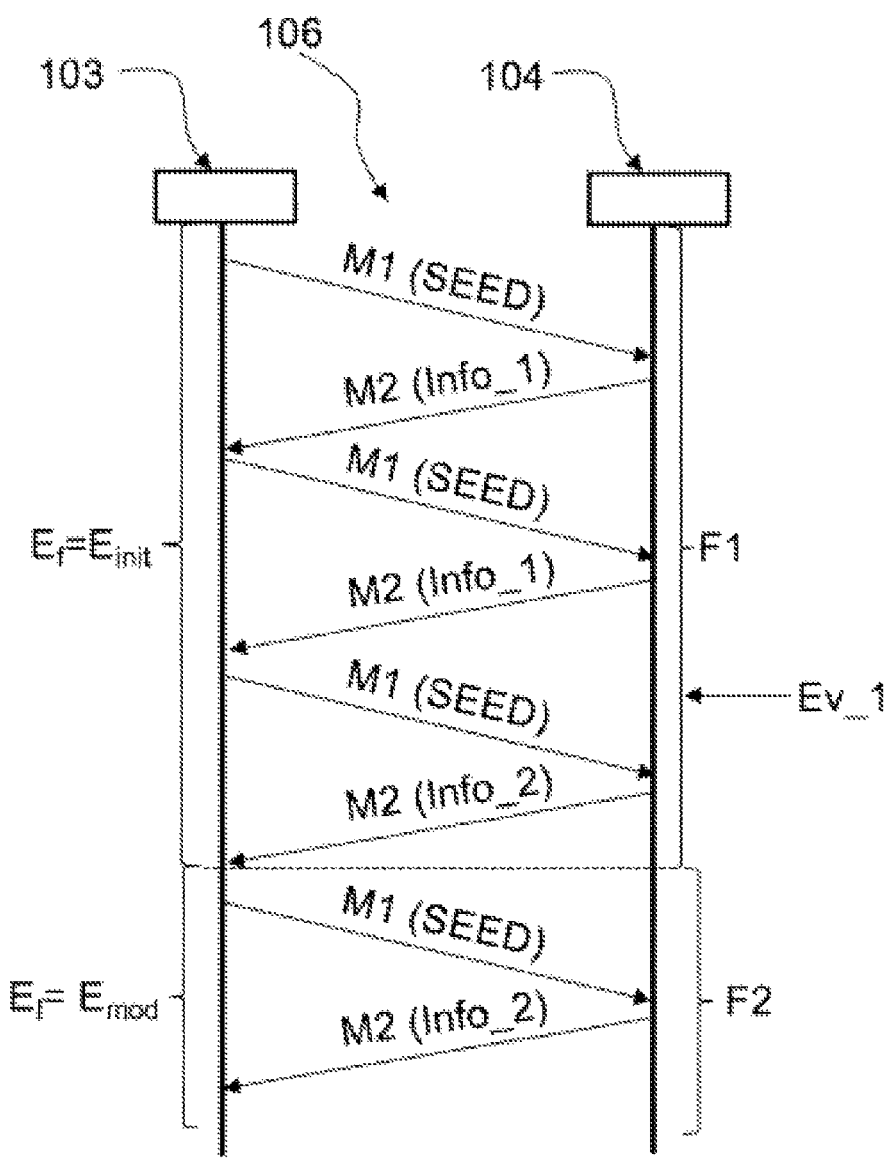
FIG. 3 illustrates a communication between two computers for implementing monitoring of the completion of an event making it possible to modify an operating state linked to the vehicle.

Described below is a method for controlling the vehicle 100, an example of a sequence of steps of which is shown in FIG. 2, and a particular embodiment of which is shown in FIG. 3. Such a control method comprises a step E100 of implementing a first operating mode F1 of the vehicle 100 in which the vehicle 100 operates at least partially. The first operating mode F1 is associated with an operating state $E_f$ of the vehicle 100 authorizing said implementation of the first operating mode F1. In FIG. 3, the operating state $E_f$ corresponds to $E_{init}$, allowing it to authorize the implementation of the first operating mode F1. Furthermore, the control method comprises a step E101 of periodically monitoring the completion of an event Ev_1 during the step E100 of implementing the first operating mode F1 to detect the event EV_1. Here, "during the step E100 of implementing the first operating mode F1" means that the monitoring step E101 is implemented while the step E100 of implementing the first operating mode F1 is executed. Such a monitoring step E101 makes it possible, because of its frequency, to ensure a fluid transition within the framework of the activation of another operating mode of the vehicle 100, making it possible, for example, to change the current operating mode of the vehicle 100. Thus, it will be understood that the control method also comprises a step E102 for modifying the operating state $E_f$, triggered by the detection of the event Ev_1 during (that is to say, by) the monitoring step E101, in order to authorize the activation of a second operating mode F2 of the vehicle 100, then a step E103 for activating the second operating mode F2 of the vehicle 100 authorized by the modified operating state $E_f$. In FIG. 3, the modified operating state $E_f$ corresponds to $E_{mod}$. Moreover, the step E102 of modifying the operating state $E_f$ results in the stopping of the implementation of the first operating mode F1: step E100 is then stopped as soon as the operating state $E_f$ is changed. Steps E100, E101, E102, E103 therefore cooperate in synergy to ensure a fluidity adapted to changes in operating mode and to their implementation, since monitoring the occurrence of the event Ev_1 makes it possible to modify the operating mode of the vehicle 100 in real time depending on the monitoring frequency. In this sense, the control method is in particular a method of controlling the operating state of the vehicle 100. It will be understood from what has been described above that the control method comprises a step E104 for completing the event Ev_1 (that is to say, a step E104 at the end of which the event has occurred) making it possible to authorize the implementation of step E102 for modifying the operating state.

In the present description, "the vehicle 100 operates at least partially" means that the vehicle 100 is activated at least partially to allow the implementation of the associated operating mode, in particular the first operating mode F1. In particular, when the vehicle 100 is operating at least partially, at least part of its powertrain is activated. The powertrain of the vehicle 100 is considered to be the set of elements making it possible to set the vehicle 100 in motion; thus, the powertrain may comprise an engine 101 of the vehicle 100 (FIG. 1).

When the vehicle 100 is operating, it is said to be "put into action," that is to say, it has a dynamic that is either partial (also called restricted dynamic) in the case in which not all of its functions are activated, or total in the case in which its functions can all be used without restriction by the driver of the vehicle 100 (also called the client). The dynamics are provided by all or part of the powertrain of the vehicle 100.

The first operating mode F1 can be an operating mode for which the vehicle 100 is partially functional; reference is then also made to partial or restricted operating mode, in particular for which the dynamic movement of the vehicle 100 is restricted.

The second operating mode F2 can be an operating mode for which the vehicle 100 is fully functional; reference is then also made to unrestricted or unconstrained operating mode, in particular for which the dynamic movement of the vehicle 100 is unrestricted.

Of course, the reverse is also true for the context where the first operating mode F1 can be an operating mode for which the vehicle 100 is fully functional and the second operating mode F2 can be an operating mode for which the vehicle 100 is partially functional.

In this sense, the control method can allow the fluid and transparent provision of the appropriate dynamics of the vehicle 100 from a restricted operating mode to an unrestricted operating mode, or vice versa.

Within the meaning of the present description, an event can correspond to a situation for which one or more conditions are met, in particular by a so-called "management" computer of the vehicle 100, that is to say, to a particular situation in which the vehicle 100 is found and which should cause a modification of its current operating mode.

"Restricted operating mode" means that the vehicle 100 is not fully functional in the sense that its operation is limited. For example, in the restricted operating mode, the engine 101 of the vehicle 100 can operate in a limited manner, such a front or rear engine 101 being intended to participate in the movement of the vehicle 100. The operating state associated with the restricted operating mode may prevent or limit the movement of the vehicle 100.

By way of example, an operating mode of the vehicle 100 can be chosen from the following: (1) an autonomous parking service for the vehicle 100 allowing the vehicle 100 to go and park on its own without the intervention of the driver, (2) a thermal preconditioning service for the vehicle 100 making it possible, for example, to preheat the vehicle 100 when stationary with a view to its subsequent use, and (3) the operation of the vehicle 100 without restriction (that is to say, all the functions of the vehicle 100 are available). Thus, the first operating mode F1 can be chosen among these operating modes, and the second operating mode F2, different from the first operating mode F1, can also be chosen from these operating modes. Each of these operating modes is associated with the operating state, which then adopts a particular value making it possible to authorize the execution of the concerned operating mode.

The control method described in the present description can be implemented by a device 102 for immobilizing the vehicle 100 (FIGS. 1 and 4), such as an ADC. Thus, an immobilizer device 102 comprises means for carrying out the steps of the control method as described. Such means are described in more detail below. In particular, the immobilizer device 102 comprises/adopts the operating state Ef, and the immobilizer device 102 is configured to:
  authorize the implementation of the first operating mode F1 when the operating state $E_f$ adopts a state associated with this operating mode F1,
  periodically monitor the occurrence of the event Ev_1 during the implementation of the first operating mode F1,
  modify the operating state $E_f$ when the immobilizer detects, via its periodic monitoring, the event Ev_1 to stop the implementation of the first operating mode F1 and authorize the implementation of the second operating mode F2.

According to one embodiment, for example illustrated in FIGS. 1 to 3, the vehicle 100 comprises a first computer 103 providing at least one service during the step E100 of implementing the first operating mode F1 and a second computer 104 ensuring the management of the vehicle 100 (the second computer 104 corresponding to the so-called "management" computer described above). The service participates in the execution of the first operating mode F1. Consequently, the monitoring step E101 can comprise: (1) a step E101-1 of periodically sending, preferably at regular intervals, a first message M1 by the first computer 103 to the second computer 104; upon each reception of the first message M1 by the second computer 104, (2) a step E101-2 of sending a second message M2 by the second computer 104 to the first computer 103; (3) upon each reception of a second message M2 by the first computer 103, a step E101-3 of processing said second message M2 by the first computer 103 triggering the implementation of the step E102 for modifying the operating state Ef when the second message M2 indicates that the event Ev_1 has been completed. This has the advantage that the operating state Ef is directly modified by the first computer 103 which performs the service(s) making it possible to execute the first operating mode F1: this first computer 103 can then, depending on the modified operating state Ef, quickly provide, if necessary, one or more services enabling the second operating mode F2 to be executed. Another advantage is that the periodic monitoring makes it possible to maintain communication over time between the first and second computers 103, 104 to allow the first computer 103 to be aware of a change in situation (occurrence of the event Ev_1) requiring it to adapt its operation in particular by modifying the operating state Ef. In other words, due to the control method, there is no need to reset the communication between the first and second computers 103, 104 for example by switching off the ignition of the vehicle 100 before switching it on again. It will be understood that the operating state Ef of the vehicle 100 can here in fact correspond to the operating state Ef of the first computer 103.

Preferably, the periodic sending of the first message M1 is such that the first message M1 is sent for example every second to the second computer 104 in order to allow the early detection, by the first computer 103, of the completion of the event. Thus, as can be appreciated, the first computer 103 repeatedly sends the first message M1 to the second computer 104.

In the present description, each service provided by the first computer 103 is adapted to the desired dynamics of the vehicle 100. For example, the service may correspond to the supply of instructions to the injectors of the engine 101 and/or to the control of the ignition coils of the engine 101 to execute the concerned operating mode, for example the first operating mode F1. For example, if the first operating mode F1 is the thermal preconditioning service, the first computer 103 can send instructions to the injectors and/or control the ignition coils as long as the speed of the vehicle 100 is zero. According to another example, if the first operating mode F1 is the autonomous parking service, the first computer 103 can send instructions to the injectors and/or control the ignition coils while limiting the speed of the vehicle 100, to remain, for example, under a 30 km/h threshold. These two examples make it possible to ensure the safety of the vehicle 100 in particular to prevent its theft.

Advantageously, as shown in FIG. 3, each second message M2 sent by the second computer 104 is produced by the second computer 104, in particular after receipt of a corresponding first message M1, such that: prior to the completion of the event Ev_1 (that is to say, before step E104), the second message M2 comprises a first piece of information Info_1 representative of the operating state $E_f$ associated with the first operating mode F1. When the event Ev_1 has been completed (that is to say, after step E104), the second message M2 comprises a second piece of information Info_2 representative of the operating state $E_f$ authorizing the activation of the second operating mode F2. In this sense, the second computer 104 is in particular configured to check the condition(s) associated with the event Ev_1, and the second computer 104 can generate/develop the second message M2 to be sent by placing the appropriate information Info_1 or Info_2 therein. The message exchange mechanism set out in this paragraph makes it possible to quickly inform the first computer 103 of a change in the situation relating to the vehicle 100 in order to quickly adapt its operating mode by changing it, in particular by activating the second operating mode F2 and by deactivating the first operating mode F1.

In particular, the communication mechanism between the first computer 103 and the second computer 104 implements encrypted keys to ensure the security of the communication and prevent the theft of the vehicle 100. In fact, each first message M1 can include a random seed "SEED" (FIG. 3) generated by the first computer 103 in particular before each sending of the first message M1 (the random seeds can then be different for each sending of the first message M1). When the second computer 104 receives the first message M1, it uses the random seed contained in the first message M1 to generate an encrypted key forming the information to be sent to the first computer 103 via a corresponding second message M2. Before completion of the event Ev_1, each encrypted key sent by the second computer 104 to the first computer 103 is representative of the operating state associated with the first operating mode F1, from which it follows that the first computer 103 keeps the current operating state. After completion of the event Ev_1, the encrypted key sent by the second computer 104 to the first computer 103 is representative of the state which the operating state $E_f$ must have in order to authorize the implementation of the second operating mode F2, and in this case the processing of the encrypted key received by the first computer 103 makes it possible to modify the current operating state $E_f$ in order to authorize the activation of the second operating mode F2.

Figure 4:
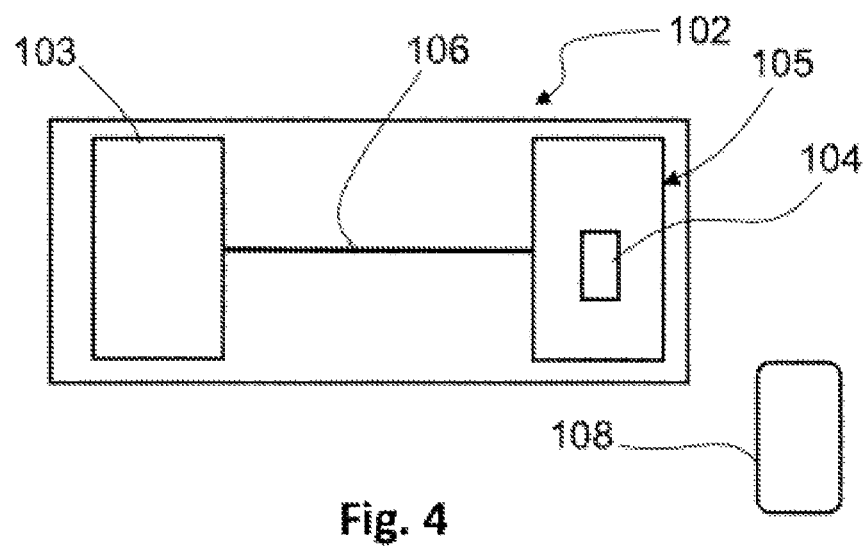
FIG. 4 illustrates an immobilizer device making it possible to implement the control method.

The second computer 104 is preferably a computer for an IAB 105 of the vehicle 100 (FIG. 4).

The first computer 103 can be chosen from: an MEC, an MCU1, an MCU2, or a TCU. Furthermore, the vehicle 100 may comprise several first computers 103 chosen from the list above, each providing one or more services allowing the execution of a corresponding operating mode by controlling, if necessary, an engine or a gearbox forming part of the powertrain of the vehicle 100. In this case, what applies to one of the first computers 103 can apply to each of the first computers 103.

Preferably, the first computer 103 and the second computer 104 communicate using the CAN network, or bus, 106 (FIGS. 3 and 4). Maintaining communication, that is to say, the mechanism for exchanging the first and second messages, between the first computer 103 and the second computer 104 via the CAN network ensures the desired fluidity when switching from the first operating mode F1 to the second operating mode F2.

The immobilizer device 102 may comprise, as illustrated in FIG. 4, the IAB 105, the first computer 103, the second computer 104 and the CAN network 106.

Thus, it is understood that according to a particular embodiment, it is sought to maintain the communication between the MEC and the IAB computer over time via the CAN network to allow the vehicle dynamics to be updated in real time in a manner adapted to the client's needs.

According to one embodiment, the operating state $E_f$ associated with the first operating mode F1 is a partial unlocking state such that the vehicle 100 operates in a restricted manner during the implementation of the first operating mode F1. According to this embodiment, the control method comprises a step E105 for authenticating an identification device 107 (FIGS. 1 and 2) of the vehicle 100, resulting in the completion of the event Ev_1 (step E104). Consequently, the step E102 of modifying the operating state $E_f$ ensures the passage from the operating state $E_f$ to a state $E_1$ of total unlocking of the vehicle 100 allowing the operation of the vehicle 100 without restriction. In other words, after the modification step E102, the operating state $E_f$ adopts the state $E_1$ of total unlocking. The authentication step E105 is implemented in particular during the step E100 for implementing the first operating mode F1. This has the advantage of automatically unlocking the functions of the vehicle 100 when the identification device 107 is authenticated. The identification device 107 is in particular such that it authenticates itself, preferably automatically, to the second computer 104, for example when it is present in the passenger compartment of the vehicle 100, which is representative of a situation where the driver wishes to use his vehicle 100. According to this embodiment, the first operating mode F1 can be the thermal preconditioning service of the vehicle or the autonomous parking service of the vehicle 100, which advantageously provides additional functions to the vehicle 100. It will be understood that according to this embodiment, the event Ev_1 is considered to have occurred when the authentication condition of the identification device 107 has been verified, in particular by the second computer 104.

According to another embodiment, the operating state Ef associated with the first operating mode F1 is the total unlocking state E1 allowing unrestricted operation of the vehicle 100. The control method can then comprise a step E106 (FIG. 2) for requesting activation of the second operating mode F2. The event Ev_1 is then said to comprise the step E106 for requesting the activation of the second operating mode F2 in the sense that the step E106 is a condition for the completion of the event Ev_1. The advantage here is to easily allow the execution of the second operating mode F2 on request, for example from the driver. Preferably, the device 107 for identifying the vehicle 100 being present in the passenger compartment of the vehicle 100 during the step of implementing the first operating mode F1, the event Ev_1 comprises the removal of the identification device 107 from the passenger compartment. In this sense, the completion of the event Ev_1 is subject to the verification, preferably by the second computer 104, of two conditions, namely step E106 and the removal of the identification device 107 from the passenger compartment. This makes it possible to switch easily from a situation for which the driver drives the vehicle 100, or is simply present in the vehicle 100 with his identification device 107, to a situation where he leaves his vehicle 100 and activates a particular service such as the autonomous parking service or the thermal preconditioning service. According to an improvement of this embodiment, the second operating mode F2 is an autonomous parking service for the vehicle 100 or a thermal preconditioning service for the vehicle 100, and at the end of the implementation of this service, the control method comprises a step E107 of stopping (FIG. 2) the second operating mode and a step of changing the operating state to a locked state E0 of the vehicle ensuring the immobilization of the vehicle. This has the advantage of securing the vehicle 100 after the completion of this service.

In FIG. 2, steps E105 and E106 are shown in dotted lines because they are exclusive, their implementation depending on the type of first operating mode.

The identification device 107 can be a mechanical key, an HFI, or a smartphone.

Figure 5:
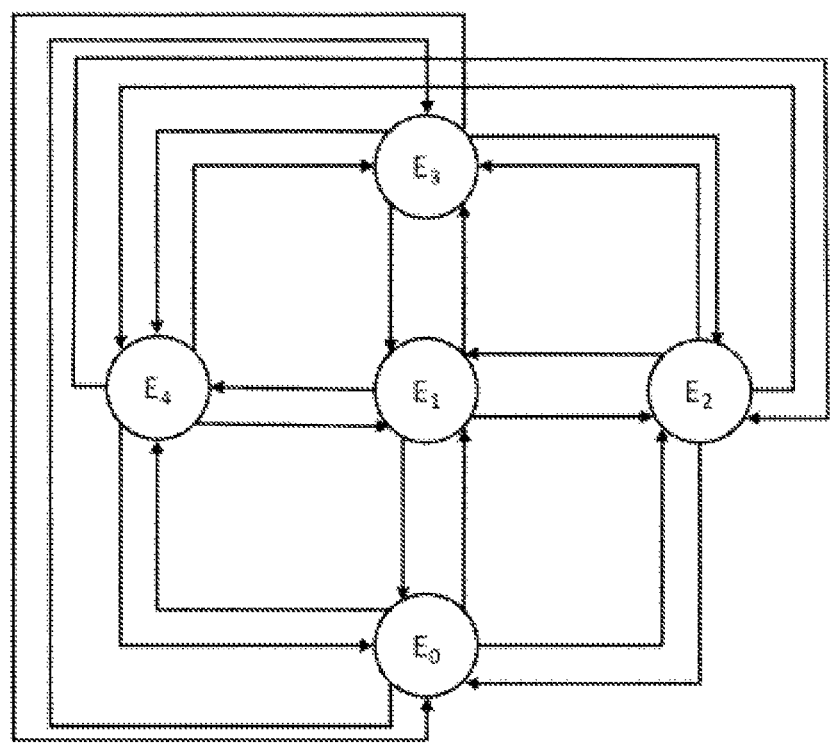
FIG. 5 illustrates the complete sequence of the states that the operating state can adopt.

It follows from what has been described above that the operating state $E_f$ can adopt any of the following states, shown by way of example in FIG. 5:
- the state $E_1$ of total unlocking authorizing the implementation of an operating mode of the vehicle 100 without restriction, that is to say, the operating mode associated with the state $E_1$ of total unlocking allows access to all the functions of the vehicle 100: the full dynamics of the vehicle are available,
- the locked state $E_0$ making it possible to ensure the immobilization of the vehicle 100,
- each of the partial unlocking states $E_2$, $E_3$, $E_4$ each authorizing the implementation of an operating mode associated with said partial unlocking state and for which the vehicle 100 operates in a restricted manner in order to provide a service linked to said operating mode: each partial unlocking state therefore allows restricted dynamics of the vehicle 100.

Preferably, each operating mode associated with the operating state $E_f$ adopting a corresponding partial unlocking state is a so-called "connected" service. In this sense, step E106 for requesting activation of the second operating mode F2, or more generally of this connected service, can be carried out using a remote control device 108 (FIG. 4) configured to send a control instruction to the vehicle 100, in particular to the second computer 104, the reception of which makes it possible to verify a condition linked to the occurrence of the event Ev_1. The remote control device 108 can be a "smartphone." The remote control device 108 can then be remote from the vehicle 100 when it sends the control instruction to the vehicle 100, which then comprises a suitable receiver.

In FIG. 5, each arrow starting from one state and pointing to another state represents a possible modification of the operating state $E_f$. Here, the partial unlocking state $E_2$ is a state authorizing the implementation of the thermal preconditioning service of the vehicle 100, the partial unlocking state $e_3$ is a state authorizing the implementation of the autonomous parking service, and the partial unlocking state $E_4$ is a state authorizing the implementation of an additional service involving restricted dynamics of the vehicle 100. If in the first operating mode F1 the operating state $E_f$ is any one of the partial unlocking states $E_2$, $E_3$, $E_4$, and the event is the authentication of the identification device 107 of the vehicle 100, then this authentication allows the passage from the concerned partial unlocking state to the total unlocking state $E_1$. If in the first operating mode F1 the operating state $E_f$ is the total unlocking state $E_1$, and the event corresponds to a loss of the authentication of the identification device 107 of the vehicle 100 and to a request for activation of a service associated with any one of the partial unlocking states, then the operating state $E_f$ changes from the full unlocking state $E_1$ to the partial unlocking state $E_2$, $E_3$, $E_4$ authorizing the service whose activation has been requested. When the operating state $E_f$ is in any one of the partial unlocking states $E_2$, $E_3$, $E_4$ and the event corresponds to a request for activation of a service associated with another of the states $E_2$, $E_3$, $E_4$ for partial unlocking while the identification device 107 of the vehicle 100 is not authenticated, then the operating state $E_f$ passes to this other of the partial unlocking states. When the operating state $E_f$ is in any one of the partial unlocking states $E_2$, $E_3$, $E_4$ and the event corresponds to the stopping of the service authorized by the operating state $E_f$, then the operating state $E_f$ can change to the locked state $E_0$. When the operating state $E_f$ is the locked state $E_0$, the authentication of the vehicle 100 identification device 107 corresponds to the completion of an event allowing the transition from the operating state to the total unlocking state $E_1$. When the operating state is the locked state $E_0$, the request to activate any of the services associated with the partial unlocking states, while the identification device 107 is not authenticated, allows the passage from the operating state $E_f$ to the state of partial unlocking authorizing the service whose activation is requested. Furthermore, when the operating state is the total unlocking state $E_1$ and the identification device 107 leaves the vehicle 100 without any request for activation of another service being made, the operating state changes to the locked state $E_0$.

Two particular examples are described below (FIGS. 6 and 7) for which the first computer 103 is an MEC and the second computer 104 is an IAB computer which exchange messages on the CAN network 106. In these FIGS. 6 and 7, "Send SEED" corresponds to a first message M1 and "Send response KEY_X" with X being an integer which corresponds to a second message M2.

Figure 6:
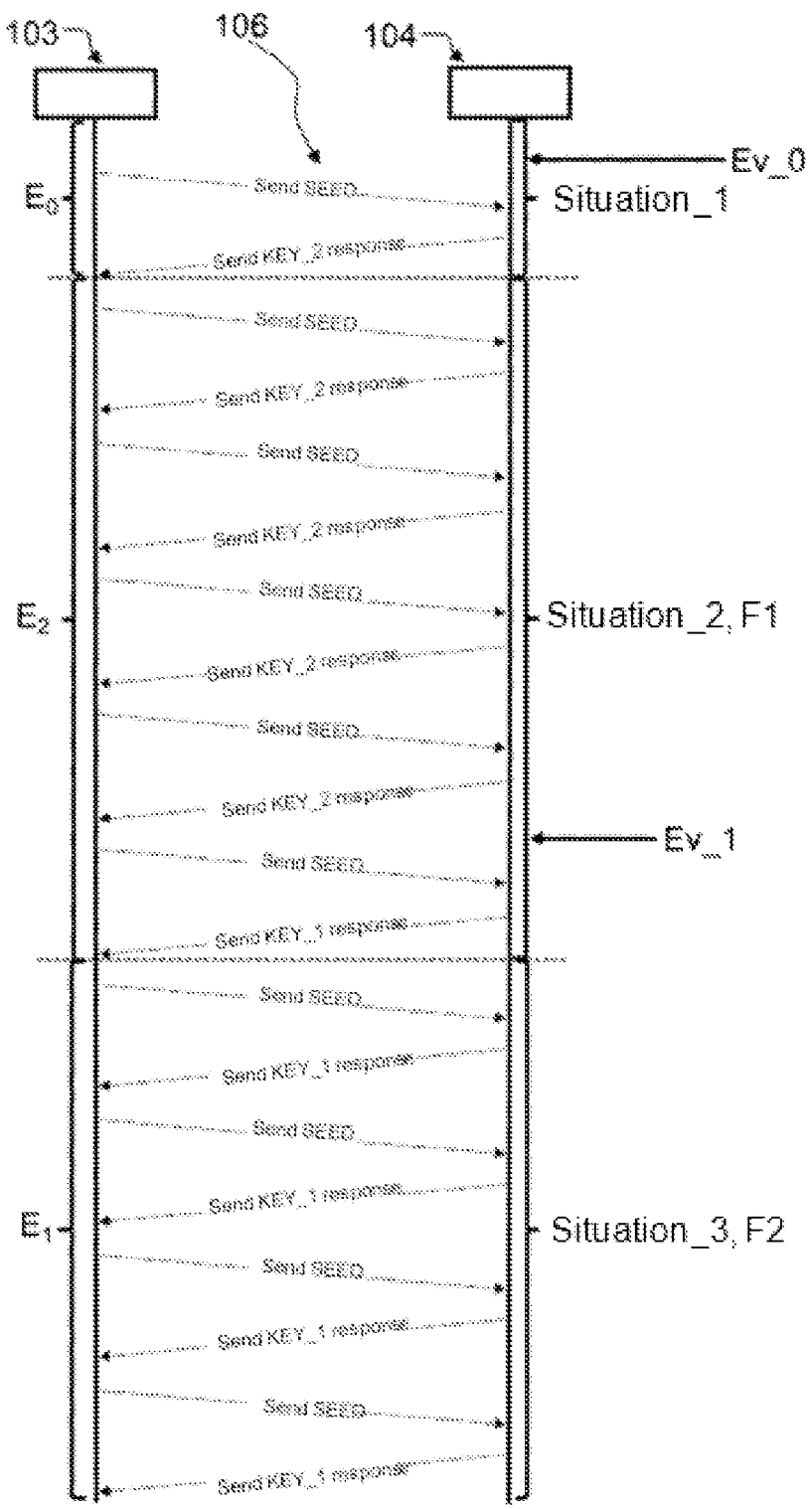
FIG. 6 illustrates a particular example of communication between two computers allowing the operating state to be modified several times.

According to the particular example of FIG. 6, the first operating mode F1 is the thermal preconditioning service of the vehicle 100, which is, for example, implemented when this vehicle 100 is parked. First of all ("Situation_1"), the operating state of the MEC adopts the locked state $E_0$ for which the dynamics of the vehicle 100 are unavailable (the MEC is off), which results in an absence of instructions to the ignition coils of the engine of the vehicle 100 and/or in the absence of instructions to the injectors of the engine of the vehicle 100. Upon activation "Ev_0" of the thermal preconditioning service, preferably via the remote control device 108, the MEC wakes up and sends a random number "Send SEED" generated by the MEC; this random number is sent via the CAN network 106 to the IAB computer. In fact, here on receipt by the IAB of a request to activate the thermal preconditioning service, the IAB is responsible for waking up the MEC via the control of the RAC (Remote Alarm Clock) line supplying the MEC in particular. The IAB computer responds "Send KEY_2 response" to the MEC via the CAN network 106 by sending the MEC the encrypted key "KEY_2," in particular generated using the random number received for security reasons. On receipt of "KEY_2," and the MEC switches to the partial unlocking state $E_2$ authorizing the execution of the thermal preconditioning service. Preferable, the vehicle 100 is then put into action as long as the speed of the vehicle 100 is zero ("Situation_2"). In this "Situation_2," the dynamics of the vehicle 100 are restricted, for example by allowing the ignition coils of the engine of the vehicle 100 to be controlled and/or the sending of instructions to the injectors of the engine of the vehicle 100 only if the speed of the vehicle 100 is zero. Then, as long as the operating state $E_f$ of the MEC is in the partial unlocking state $E_2$, a random number "SEED" is generated periodically by the MEC (for example once per second) and then is sent "Send SEED" via the CAN network 106 to the IAB computer. Then, the IAB computer responds "Send KEY_2 response" to the MEC via the CAN network by sending the encrypted key "KEY_2" to the MEC for each random number "SEED" received periodically as long as no event identified by the IAB computer indicates that the first operating mode F1 must change. As long as the MEC periodically receives "KEY_2," the MEC maintains its operating state $E_f$ in the partial unlocking state $E_2$. If the following event Ev_1 occurs: the driver enters his vehicle 100 equipped with his HFI during the execution of the thermal preconditioning service, then the IAB computer authenticates the HFI and responds "Send KEY_1 response" to the MEC via the CAN network 106 by sending the encrypted key "KEY_1" to the MEC in response to the reception of the random number "SEED" following this event Ev_1. On receipt of "KEY_1," the MEC detects that the event Ev_1 has occurred and switches to the total unlocking state $E_1$, which allows the driver to have the full dynamics of his vehicle ("Situation_3"), thus making it possible to activate the second operating mode F2. Here, the complete dynamics make it possible to control the ignition coils of the engine of the vehicle 100 and/or to send instructions to the injectors of the engine of the vehicle 100 without any restriction. During "Situation_3," the communication between the MEC and the IAB computer continues (exchanges "Send SEED" and "Send KEY_1 response"), for example to allow the detection of another event which will make it possible to further modify the operating state $E_f$. Alternatively (not shown), if the event corresponds to the end of the execution of the thermal preconditioning service, the IAB computer stops, in the absence of any other request to the dynamics of the vehicle 100 from the driver, responding to the MEC, which in this case switches back to the locked state $E_0$.

Figure 7:
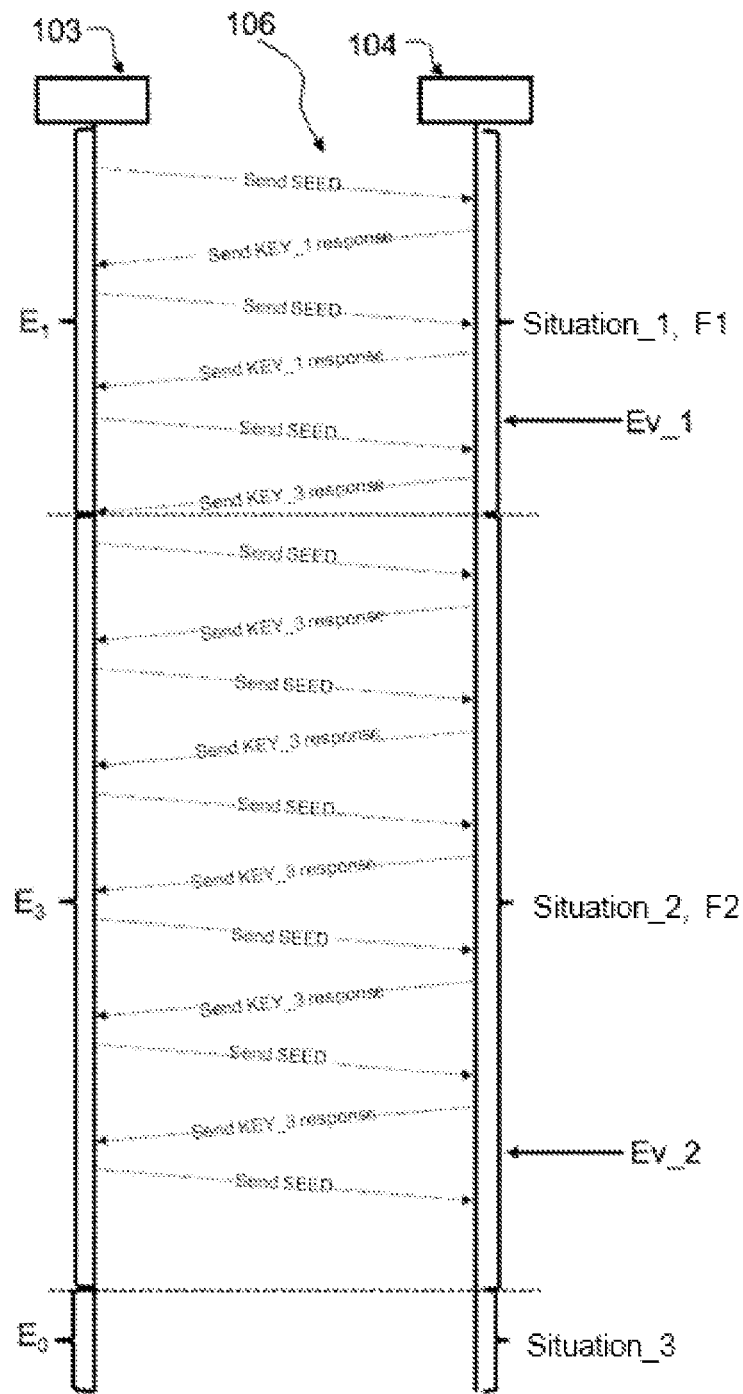
FIG. 7 illustrates another particular example of communication between two computers allowing the operating state to be modified several times.

The particular example illustrated in FIG. 7 is now described, for which the first operating mode F1 is such that the operating state $E_f$ is the unlocked state $E_1$ allowing full dynamics of the vehicle 100. In this first operating mode F1, the situation is initially as follows ("Situation_1"): the driver drives the vehicle 100, for example by traveling any route; it follows that the HFI is authenticated by the IAB computer: the HFI is therefore in the passenger compartment of the vehicle 100. Here, the operating state $E_f$ corresponds to the total unlocking state $E_1$ allowing the driver to have the full dynamics of his vehicle 100 ("Situation_1"). Here, the complete dynamics make it possible to control the ignition coils of the engine of the vehicle 100 and/or to send instructions to the injectors of the engine of the vehicle 100 without any restriction. Then, the driver will seek to activate, as a second operating mode F2, the autonomous parking service of his vehicle 100. As long as the driver is in his vehicle 100 and the HFI is authenticated by the computer of the IAB, the MEC is maintained in the total unlocking state $E_1$. As long as the MEC is in the total unlocking state $E_1$, a random number "SEED" is generated periodically by the MEC (for example once per second) and is sent "Send SEED" via the CAN network 106 to the IAB computer. As long as the HFI is authenticated, the IAB responds "Send KEY_1 response," for each random number "SEED" received periodically, to the MEC via the CAN network 106 by sending the MEC the encrypted key "KEY_1" that it generated in particular by using the random number to ensure the security of the exchange between the MEC and the IAB computer. If the driver gets out of his vehicle 100 with the HFI (loss of authentication by the IAB computer) and activates the autonomous parking service with the IAB computer, then the event Ev_1 is carried out, from which it follows that the IAB computer responds "Send KEY_3 response" to the MEC via the CAN network by sending the MEC the encrypted key "KEY_3" following receipt of the random number "SEED" following the completion of the event Ev_1. Upon receipt of "KEY_3," the MEC modifies its operating state $E_f$ by switching it to the partial unlocking state $E_3$, this allowing the provision of restricted dynamics of the vehicle 100 for the execution of the autonomous parking service as the second operating mode F2 ("Situation_2" in FIG. 7). For example, during the implementation of the autonomous parking service, the restricted dynamics of the vehicle 100 allows control of the ignition coils of the engine of the vehicle 100 and/or a sending of instructions to the injectors of the engine of the vehicle 100 not allowing the vehicle 100 to cross a speed threshold, for example 30 km/h, in order to avoid the theft of the vehicle. Once the vehicle is parked "Ev_2," the autonomous parking service ends: the IAB computer stops responding to the MEC, from which it follows that the operating state $E_f$ of the MEC changes to the locked state $E_0$ for which the dynamics of the vehicle 100 are unavailable, which results in an absence of instructions at the ignition coils and/or the absence of instructions at the injectors ("Situation_3").

Of course, it is also understood that the present invention applies to a vehicle 100, in particular a motor vehicle, comprising the immobilizer device 102 as described (FIGS. 1 and 5). The advantages of such a vehicle 100 result from those described above in combination with the control method and the immobilizer device 102.

Everything that applies to the control method can apply to the immobilizer 102 or vice versa.

The present invention allows the driver to obtain full use of his vehicle 100 even in the event of a service, in particular a connected service, during execution, without requesting it for example by switching off and then re-starting the ignition. Likewise, the execution of a connected service is possible as soon as the driver leaves his vehicle 100, for example by activating this service using the remote control device 108. The inviolability of the vehicle 100 during the execution of the various operating modes remains preserved owing to the immobilizer device, which can, if necessary, limit the functions of the vehicle 100. The described connected services are simple to launch and are easy for the driver to use (no unwanted manipulation required on his part to launch these connected services outside of an activation, for example via the control device 108, regardless of the vehicle situation 100). Another advantage is that the additional cost of a vehicle 100 for implementing the control method is limited because the control method can be implemented by impacting the software embedded in the first and second computers 103, 104 which are already present in the vehicle 100: the architecture of existing vehicles should not be changed in depth to incorporate the present invention.

Thus, the present invention can be applied starting from existing electrical/electronic architectures while allowing the immobilizer device to guarantee the inviolability of the vehicle 100 and while being compatible with connected services. The periodic exchanges of the first and second messages M1, M2 make it possible, where appropriate, to partially unlock the MEC/MCUx/TCU computers and to restrict their services from contributing to the dynamics of the vehicle 100 depending on the connected service being executed, then, in the event of authentication of an HFI by the IAB computer during the execution of this connected service and without any additional action from the customer, to fully unlock the MEC/MCUx/TCU computers and free them from any service restriction. Conversely, these same periodic exchanges of the first and second messages M1, M2 make it possible, where appropriate, to completely unlock the MEC/MCUx/TCU computers in the event of authentication of a HFI by the IAB, then to partially unlock these MEC/MCUx/TCU computers and to restrict their services if the driver chooses to perform a connected service after driving his vehicle.

The present invention finds industrial application in the field of vehicles, in particular automobiles, in the sense that the immobilizer device 102 can, according to the invention, be integrated into the vehicle 100.

The invention claimed is:

1. A method for controlling a vehicle, said control method comprising implementing a first operating mode of the vehicle, for which the vehicle operates at least partially, the first operating mode being associated with a first operating state of the vehicle allowing said implementation of the first operating mode, wherein said method comprises:
periodically monitoring the completion of an event during the step of implementing the first operating mode in order to detect the event,
modifying the operating state upon detection of the event, for authorizing the activation of a second operating mode of the vehicle associated with a modified operating state, said modified operating state being different from first operating state,
activating the second operating mode of the vehicle authorized by the modified operating state,
the vehicle further comprising a first computer providing at least one service during the step of implementing the first operating mode and a second computer adapted to ensure the management of the vehicle, wherein the step of periodically monitoring comprises:
said first computer repeatedly sending a first message to the second computer, said first message comprises a random seed generated by the first computer,
upon each reception of the first message by the second computer, said second computer generating a second message comprising an encrypted key generated using said random seed, said encrypted key being information to be sent to said first computer, and said second computer sending said second message to the first computer, and
upon each reception of the second message by the first computer, processing of said second message by the first computer triggering the implementation of the step of modifying the operating state when the second message indicates that the event has been completed.

2. The control method according to claim 1, wherein each second message sent by the second computer is produced by the second computer such that:
prior to the completion of the event, the second message comprises first information representative of the operating state associated with the first operating mode,
when the event has been completed, the second message comprises a second piece of information representative of the operating state authorizing the activation of the second operating mode.

3. The control method according to claim 1, wherein:
the operating state associated with the first operating mode is a partial unlocking state such that the vehicle operates in a restricted manner during the implementation of the first operating mode,
the control method comprises a step of authenticating a device for identifying the vehicle from which the completion of the event results,
the step of modifying the operating state ensuring the transition from the operating state to a total unlocking state of the vehicle allowing unrestricted operation of the vehicle.

4. The control method according to claim 1, wherein the first operating mode is a thermal preconditioning service of the vehicle or an autonomous parking service of the vehicle.

5. The control method according to claim 1, wherein:
the operating state associated with the first operating mode is a total unlocking state allowing unrestricted operation of the vehicle,
the control method comprises a step of requesting activation of the second operating mode,
the event comprises the step of requesting activation of the second operating mode.

6. The control method according to claim 5, wherein, when an identification device of the vehicle is present in a passenger compartment of the vehicle during the step of implementing the first operating mode, the event comprises the removal of the identification device from the passenger compartment.

7. The control method according to claim 5, wherein the second operating mode is an autonomous parking service for the vehicle or a thermal preconditioning service for the vehicle, and in that at the end of the implementation of this service, the control method comprises a step of stopping the second operating mode and a step of changing the operating state to a locked state of the vehicle ensuring the immobilization of the vehicle.

8. An immobilizer device for a vehicle, characterized in that the immobilizer device comprises means for carrying out the steps of the control method according to claim 1.

9. A vehicle characterized in that it comprises the immobilizer device according to claim 8.

10. The method according to claim 1 wherein the first computer sends the first message to the second computer at regular intervals.

11. The method according to claim 1 wherein the first computer sends the first message to the second computer every second.

12. A method for changing the operating mode of a vehicle between a first operating mode of the vehicle and a second operating mode of the vehicle; wherein, in the first operating mode, the is in a first operating state and in the second operating mode, the vehicle is in a second operating state different from the first operating state; said vehicle comprising, a first computer providing at least one service for the vehicle and a second computer adapted to ensure the management of the vehicle; wherein, while the vehicle is operating in the first mode, the method comprises:
said first computer repeatedly sending a first message to the second computer, said first message comprises a random seed generated by the first computer,
said second computer, in response to the reception of each first message generating a second message comprising an encrypted key generated using said random seed, said encrypted key being information to be sent to said first computer, and said second computer sending said second message to the first computer,
said second computer monitoring for the completion of an event, wherein prior to the completion of the event, the second message comprises first information representative of the operating state associated with the first operating mode, and detecting completion of the event, the second computer alters the second message such that the second message comprises a second piece of information representative of the operating state authorizing the activation of the second operating mode;
said first computer, upon receipt of the second message containing said second piece of information, modifying the operating mode of the vehicle from said first operating mode to said second operating mode.

13. The method of claim 12 wherein the method does require a reset of communication between the first and second computers to change the operating mode of the vehicle.

14. The method of claim 12 wherein the step of modifying the operating mode of the vehicle occurs while an ignition of the vehicle is switched on.

\* \* \* \* \*